(12) United States Patent
Nagao

(10) Patent No.: US 7,379,212 B2
(45) Date of Patent: May 27, 2008

(54) PRINT PROCESSING APPARATUS AND PRINT PROCESSING METHOD

(75) Inventor: Kenji Nagao, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 800 days.

(21) Appl. No.: 10/820,170

(22) Filed: Apr. 7, 2004

(65) Prior Publication Data

US 2005/0007634 A1 Jan. 13, 2005

(30) Foreign Application Priority Data

Apr. 10, 2003 (JP) ............ P.2003-106595

(51) Int. Cl.
*H04N 1/40* (2006.01)

(52) U.S. Cl. ............ 358/3.2; 358/2.1

(58) Field of Classification Search ............ 358/1.9, 358/2.1, 3.1, 1.18, 520–523, 462, 464, 3.2, 358/3.11–3.12
See application file for complete search history.

(56) References Cited

U.S. PATENT DOCUMENTS 6,190,058 B1 * 2/2001 Koide et al. ............ 358/1.9
7,057,776 B2 * 6/2006 Akiyama ............ 358/462

FOREIGN PATENT DOCUMENTS

| JP | 04158048 A * | 6/1992 |
|---|---|---|
| JP | 2000-066658 | 3/2000 |
| JP | 2000-069309 | 3/2000 |
| JP | 2000-153640 | 6/2000 |
| JP | 2001-105670 | 4/2001 |
| JP | 2002-262113 | 9/2002 |

* cited by examiner

*Primary Examiner*—Thomas D. Lee
*Assistant Examiner*—Stephen Brinich
(74) *Attorney, Agent, or Firm*—Hogan & Hartson LLP

(57) ABSTRACT

The present invention provides a print processing apparatus which enhances the legibility of specific print contents such as a small-sized character. In the step executed in case it is determined by the screen processor that the object type is a character, it is determined whether the character size is equal to or smaller than X point. In case the character size is equal to or smaller than X point, execution assumes a small character size and proceeds to screen processing for small-sized characters. In case the character size exceeds X point, execution determines that the character size is a normal size or greater and proceeds to screen processing for normal-sized characters. The screen processing for small-sized characters performs density setting shifted in the direction of a lower density compared with the screen processing for normal-sized characters.

19 Claims, 7 Drawing Sheets

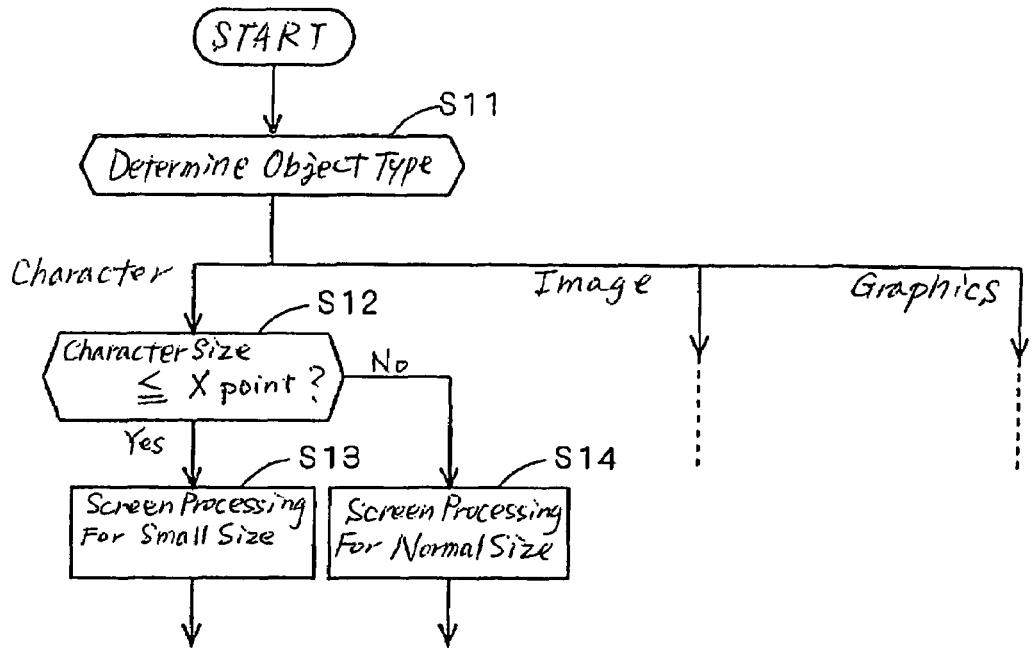
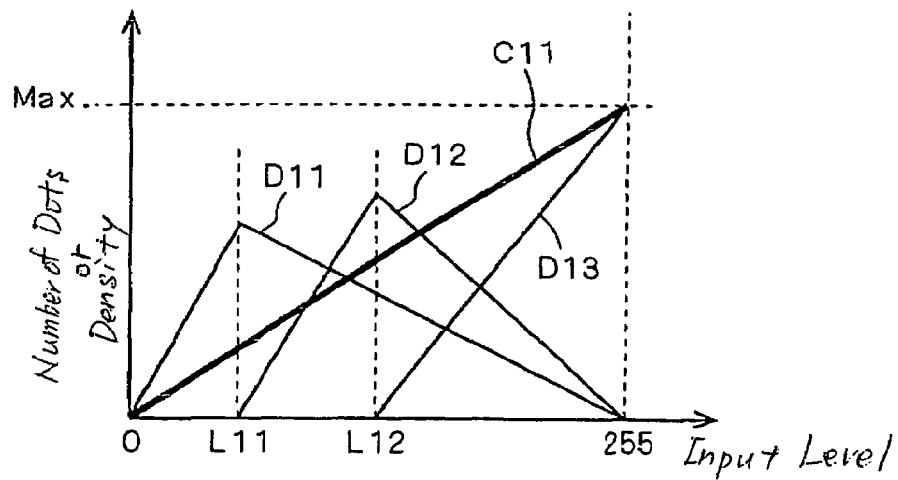

PRINT PROCESSING APPARATUS AND PRINT PROCESSING METHOD

BACKGROUND OF THE INVENTION

1. Field of the Invention

The present invention relates to a print processing apparatus and in particular to its screen processing.

2. Description of the Related Art

As apparatus to display legible characters, there is provided for example image processing apparatus disclosed in the Japanese Patent Laid-Open No. 2000-66658. The image processing apparatus references character attribute information and screen size information and converts a character color to prevent degradation of legibility of the characters irrespective of the screen size.

However, the image processing apparatus sets the display parameter of a character based on the degree of discrimination of the character against its background and does not consider the printout of a small-sized character.

In particular, when an ink-jet printer outputs a small-sized character from 2 to 3 point, setting the density by way of typical half-tone processing based on the gradient of the character emphasizes spreading of ink especially in case the density is high. This results in far more noticeable batter of a character than the output result of an electrophotographic printer such as a laser printer, thus failing to obtain high-quality characters. In case the overall printing density is lowered in order to avoid spreading of a small-sized character, the color tone of the overall print document is degraded and the color balance is lost.

SUMMARY OF THE INVENTION

The invention has been accomplished to solve the problems and aims at providing print processing apparatus which enhances the legibility of specific print contents such as a small-sized character without losing the overall color balance.

According to a first aspect of the invention, a screen processor performs specific screen processing which performs density setting by applying, as a density setting parameter, a parameter shifted to a lower density than the data on the preceding screen except specific data, to specific data out of data for drawing a specific object.

Thus, it is possible to print only specific data out of the data for drawing a specific object at a relatively low density.

For example, in case the specific data is character drawing data to define a small-sized character, the small-sized character is not likely to spread when printed, thus enhancing the legibility of the small-sized character.

In case the specific data is non-character data selected in accordance with a predetermined selection method, it is possible to enhance the legibility of the selected non-character data.

The data except the specific data is not printed at the lower density than the normal density, which keeps the overall density balance of the printout.

According to a second aspect of the invention, a gradient adding section performs forcible gradient setting processing which sets a specific gradient to specific data out of drawing data on a per pixel basis and gradient adjustment processing which avoids setting of the specific gradient to the drawing data except the specific data.

Thus, the screen processor can perform specific screen processing on specific data on a per pixel basis even in case the screen processing on a per specific object is impossible, by recognizing whether the target data is specific data based on the gradient in the drawing data.

Step (c) of a third aspect of the invention performs specific screen processing which performs density setting by applying, as a density setting parameter, a parameter shifted to a lower density than the data on the preceding screen except specific data, to specific data out of the data for drawing the specific object.

Thus, it is possible to print only specific data out of the data for drawing a specific object at a relatively low density.

For example, in case the specific data is character drawing data to define a small-sized character, the small-sized character is not likely to spread when printed, thus enhancing the legibility of the small-sized character.

In case the specific data is non-character data selected in accordance with a predetermined selection method, it is possible to enhance the legibility of the selected non-character data.

In step (c), the data except the specific data is not printed by the specific screen processing at the lower density, which keeps the overall density balance of the printout.

According to a fourth aspect of the invention, step (a) includes a step (a-1) of setting a specific gradient to specific data out of drawing data on a per pixel basis and a step (a-2) of avoiding setting of the specific gradient to the drawing data except the specific data.

Thus, it is possible to perform specific screen processing on specific data on a per pixel basis even in case the screen processing on a per specific object is impossible, by recognizing whether the target data is specific data based on the gradient in the drawing data.

BRIEF DESCRIPTION OF THE DRAWINGS

FIG. 2 is a flowchart showing part of the processing by the screen processor in the print processing system according to Embodiment 1 of the invention;

FIG. 3 illustrates the screen processing for normal-sized characters (Example. 1);

Figure 1:
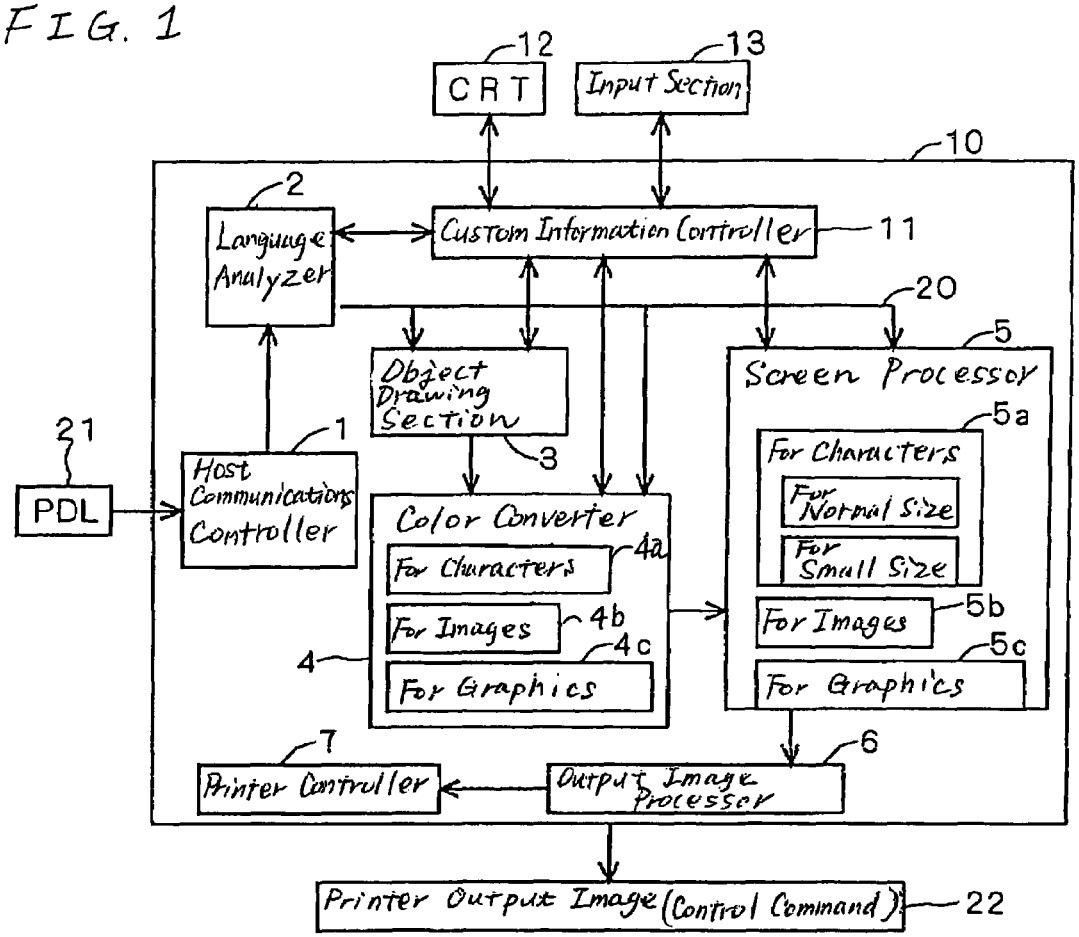
FIG. 1 is a block diagrams showing a configuration of print processing apparatus in a print system used in Embodiments 1 through 3 of the invention.

In the drawings, a reference numeral 1 refers to an host communications controller; 2 to a language analyzer; 3 to an object drawing section; 4 to a color converter; 5 to a screen processor; 6 to an output image processor; 7 to a printer controller; 10 to a print processing apparatus; 11 to a custom information controller; 12 to a CRT; and 13 to an input section.

DETAILED DESCRIPTION OF THE PREFERRED EMBODIMENTS

<Principle of the Invention>

There is provided a printer system which employs the PDL (Page Description Language) such as PostScript (registered trademark) as drawing data to be input. The PDL is a language whereby an optimum image quality is provided on a per object basis by changing the screen and color tone in units of objects such as a character, graphics and an image.

The invention changes the print processing on an ink-jet printer which employs the PDL for specific data such as when printing small-sized characters.

<Configuration>

FIG. 1 is a block diagrams showing a configuration of print processing apparatus 10 in a print system used in Embodiments 1 through 3 of the invention.

As shown in FIG. 1, the print processing apparatus 10 comprises a host communications controller 1, a language analyzer 2, an object drawing section 3, a color converter 4, a screen processor 5, an output image processor 6, a printer controller 7 and a custom information controller 11.

The host communications controller 1 receives drawing data described in the PDL (hereinafter referred to as PDL data) 21 and passes the PDL data 21 to the language analyzer 2. The language analyzer 2 analyzes the contents of the PDL data 21, performs intermediate language processing on the PDL data 21, and classifies the PDL data 21 into objects such as a character, an image and graphics. In this way, character drawing data, image drawing data or graphics drawing data is obtained as drawing data on a per object basis. The drawing data per object is transmitted to the object drawing section 3 and the screen processor 5 via a bus 20 and directly to the custom information controller 11.

The object drawing section 3 performs drawing processing to write information into an address corresponding to the pixel on a per object basis based on the drawing data as a result of the second processing of the language analyzer 2. The color converter 2 performs appropriate color conversion on an object which has undergone drawing processing. The color converter 4 includes a character color converter 4a, an image color converter 4b and a graphics color converter 4c to support color conversion of a character, an image or graphics as an object. Thus, one or more gradients of predetermined color components are added to the drawing data on a per pixel basis.

The screen processor 5 performs screen processing mentioned later on the color-converted objects (drawing data to which a gradient is added on a per pixel basis after processing by the color converter 4). The screen processor 5 includes a character processor 5a (capable of performing two types of processing, screen processing for normal sized-characters and screen processing for small-sized characters corresponding to a character or an image as an object), an image processor 5b and a graphics processor 5c to support processing of a character, an image or graphics as an object. Thus, one or more gradients of predetermined color components are added to the drawing data on a per pixel basis.

The output image processor 6 forms a final output image (including an ESCP command such as form feed) from a screen-processed object. The printer controller 7 outputs a printer output image 22 such as a printer control command based on the final output image obtained from the output image processor 6.

The custom information controller 11 displays on the CRT 12 the status of an object analyzed by the language analyzer 2 based on the drawing data obtained from the color converter 4. Then the custom information controller 11 acts as an area selector for obtaining a selected area (part of an object) as custom information by letting the user select an image (object) displayed on the CRT 12 by way of an input section 13 including a keyboard and a mouse.

The custom information controller 11 passes the selected area (specific data) to the screen processor 5 for screen processing of the invention detailed later.

Embodiment 1

Processing by the Screen Processor 5

FIG. 2 is a flowchart showing part of the processing by the screen processor 5 in the print processing apparatus 10 according to Embodiment 1 of the invention. FIG. 2 shows the processing on the drawing data per object color-converted (gradient-added per pixel) by the color converter 4.

Referring to FIG. 2, object type is determined in step S11. This processing classifies objects into a character, an image and graphics. Processing on images or graphics has little relationship with the characteristics of this embodiment so that the processing is not shown or described.

In step S12 executed in case it is determined that the object type is a character (that the drawing data supplied to the screen processor 5 is character drawing data) in step S11, it is determined whether the character size is equal to or smaller than X point. In case the character size is equal to or smaller than X point, execution assumes specific data of a small character size and proceeds to screen processing for small-sized characters by the character processor 5a in step S13 (specific screen processing). In case the character size exceeds X point, execution determines that the character size is a normal size or greater and proceeds to screen processing for normal-sized characters by the character processor 5a in step S14.

X point as a ground for determination in step S12 may be for example a value specified by the user each time data is printed via a printer driver or a value predetermined by the printer model based on the optimum value matching the printer characteristics. For example, the value may be 3 point.

Determination in step S12 includes determination on whether to perform correction of small-sized characters. In this practice, in case the correction is specified as invalid in the configuration of the printer driver or printer system, a character size equal to or smaller than X point is treated as a normal size and execution proceeds to step S14. That is, execution proceeds from step S12 to step S13 only when the character size is equal to or smaller than X point and the correction is valid.

Screen Processing for Normal-sized Characters

Figure 4:
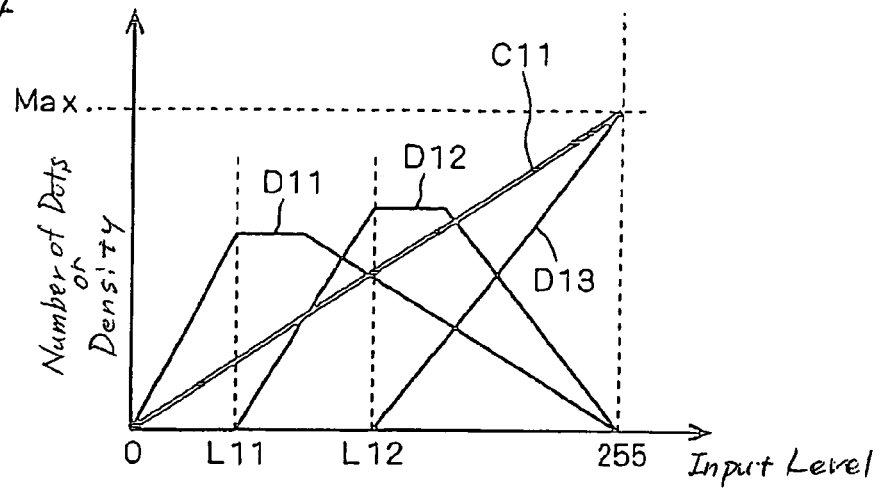
FIG. 4 illustrates the screen processing for normal-sized characters (Example. 2)
Figure 5:
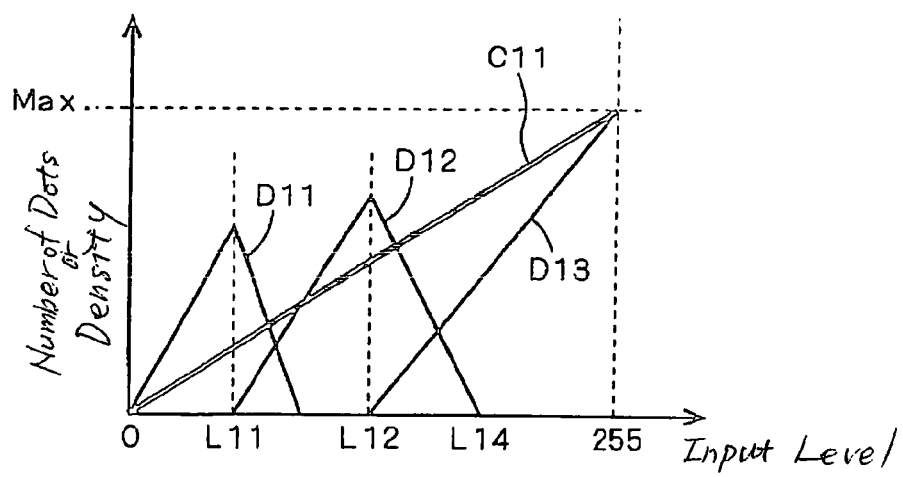
FIG. 5 illustrates the screen processing for normal-sized characters (Example. 3)
Figure 6:
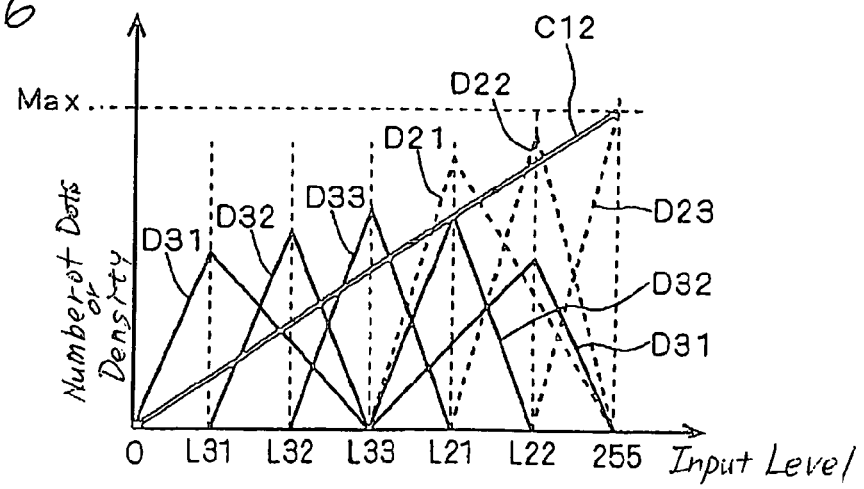
FIG. 6 illustrates the screen processing for normal-sized characters (Example. 4)

FIGS. 3 through 6 illustrate the screen processing for normal-sized characters. FIGS. 3 through 5 show the case where color channels are output in an ink of a single density. FIG. 6 shows the cases where color channels are output in inks of a plurality of densities. To be more precise, the case where the color channels CMYK are processed in a single ink corresponds to FIGS. 3 through 5 while the case where the color channels CMYK are processed in inks of a plurality of densities corresponds to FIG. 6. In any case, three types of dots, a small dot, a medium dot, and a large dot can be imprinted. For example, imprinting of a small dot, medium dot and a large dot uses inks of 4 pl (picoliters), 9 pl and 22 pl, which determines the volume of printing per dot.

The horizontal axis in FIGS. 3 through 6 represents an input level, (a value indicating the gradient of pixel 0-255; the larger the value, the greater the gradient) The vertical axis represents the number of imprinted dots of each size or print density.

In FIGS. 3 through 5, D11, D12 and D13 respectively show the number of small dots, medium dots and large dots. C11 shows a print density. In this example, the maximum value of the number of imprinted large dots has the same length as the maximum value of print density on the vertical axis.

As shown in FIG. 3, small dots are imprinted starting from the input level "0" and increases until the input level is peaked at the level L11, then decreases from the level L11 to the level "255". Medium dots are imprinted starting from the neighborhood of the level L11 and increases until the input level is peaked at the level L12 (>L11), then decreases from the level L12 to the level "255". Large dots are imprinted starting from the neighborhood of the level L12 and increases toward the input level "255".

In FIG. 4, the number of imprinted small dots D11 is maintained at the peal value from the level L11 for a predetermined period and the number of imprinted medium dots D12 is maintained at the peal value from the level L12 for a predetermined period. Except this, the control is the same as that in FIG. 3.

In FIG. 5, the number of imprinted small dots D11 is decreased to "0" from the level 11 to the level L13 (L11<L13<L12) and the number of imprinted medium dots D12 is decreased to "0" from the level 12 to the level L14 (L12<L14<"255"). Except this, the control is the same as that in FIG. 3.

As shown in FIGS. 3 through 5, by controlling the number of imprinted small dots, medium dots or large dots D11, D12, D13 as a density setting parameter, the print density C11 of a predetermined color increases as the input level increases.

In FIG. 6, D21, D22 and D23 respectively show the number of small dots, medium dots and large dots in dark ink and D31, D32 and D33 the number of small dots, medium dots and large dots in pale ink. C21 shows a print density. The input level shown in FIG. 6 increases in the order of L31, L32, L33, L21, L22, L23 and "255".

As shown in FIG. 6, small dots in pale ink are imprinted starting from "0" and increases until the input level is peaked at the level L31, then decreases from the level L31 to approximately "0" in the neighborhood of the level L33. Small dots in pale ink are imprinted again starting from the level L33 and increases until the input level is peaked at the level L22, then decreases from the level L22 to the level "255".

Medium dots in pale ink are imprinted starting from the neighborhood of the level L31 and increases until the input level is peaked at the level L32, then decreases from the level L32 to approximately "0" in the neighborhood of the level L33 (>L32). Medium dots in pale ink are imprinted again starting from the level L33 and increases until the input level is peaked at the level L21, then decreases from the level L21 to "0" at the level L22.

Large dots in pale ink are imprinted starting from the neighborhood of the level L32 and increases until the input level is peaked at the level L33, then decreases from the level L33 to approximately "0" in the neighborhood of the level L21 (>L33).

Small dots in dark ink are imprinted starting from the neighborhood of the level L33 and increases until the input level is peaked at the level L21, then decreases from the level L21 to approximately "0" at the level "255". Medium dots in dark ink are imprinted starting from the neighborhood of the level L21 and increases until the input level is peaked at the level L22, then decreases from the level L22 to approximately "0" at the level "255". Large dots in dark ink are imprinted starting from the neighborhood of the level L22 and increases toward the input level "255". In this way, by controlling the number of imprinted small dots, medium dots or large dots in dark ink D21, D22, D23 and the number of imprinted small dots, medium dots or large dots in pale ink D31, D32, D33 as density setting parameters, the print density C12 of a predetermined color increases as the input level increases.

Even in case a plurality of densities are used, some of the dots may be imprinted so as to maintain the peak value for a predetermined period as shown in FIG. 4. As shown in FIG. 5, control may be made to avoid imprinting of dots except large dots in dark ink until the level "255" is reached.

As mentioned hereinabove, by executing the dithering method or error diffusion method after the dot type and the number of imprinted dots have been determined, the final screen processing is complete.

In this way, in case a large value near the input level "255" is indicated in the screen processing for normal-sized characters, printing is made mainly using large dots. In case the screen processing for normal-sized characters is applied to the screen processing for small-sized characters, the printout is likely to include batter of characters thus failing to provide high-quality printing.

Screen Processing for Small-sized Characters

Figure 7:
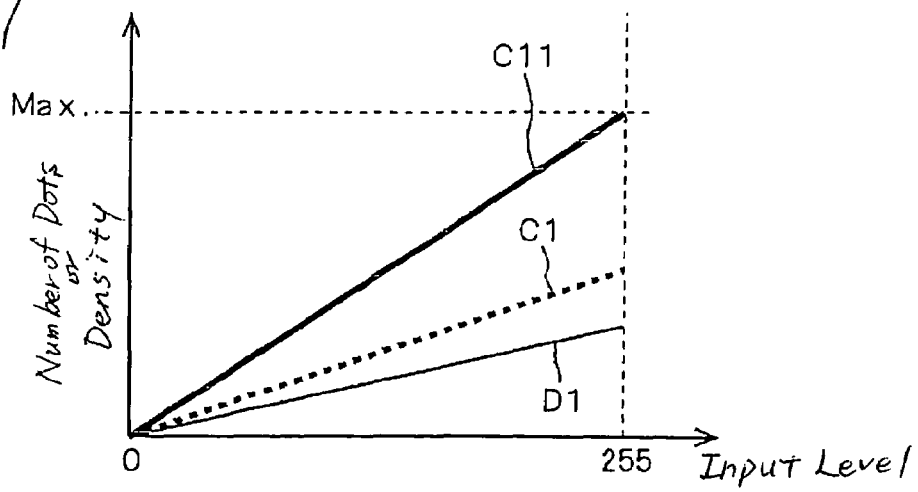
FIG. 7 illustrates the screen processing for small-sized characters (Example. 1)

FIGS. 7 through 11 illustrate the screen processing for small-sized characters. FIG. 7 shows the case where color channels are output in an ink of a single density. FIGS. 8 through 11 show the cases where color channels are output in inks of a plurality of densities. In any case, only small dots are imprinted. The horizontal axis in FIGS. 7 through 11 represents an input level and the vertical axis in the same drawings represents the number of imprinted dots of each size or print density.

In FIG. 7, D1 represents the number of imprinted small dots and C1, C11 the print density in the screen processing of small-sized and normal-sized characters. As shown in FIG. 7, small dots are imprinted starting from "0" and increases at a relatively mild inclination toward the input level "255". In this way, by controlling the number of imprinted small dots D1 as a density parameter, the density increases in proportion to the input level. Note that the print density C1 is shifted in the direction of a lower density compared with the print density C11.

Figure 8:
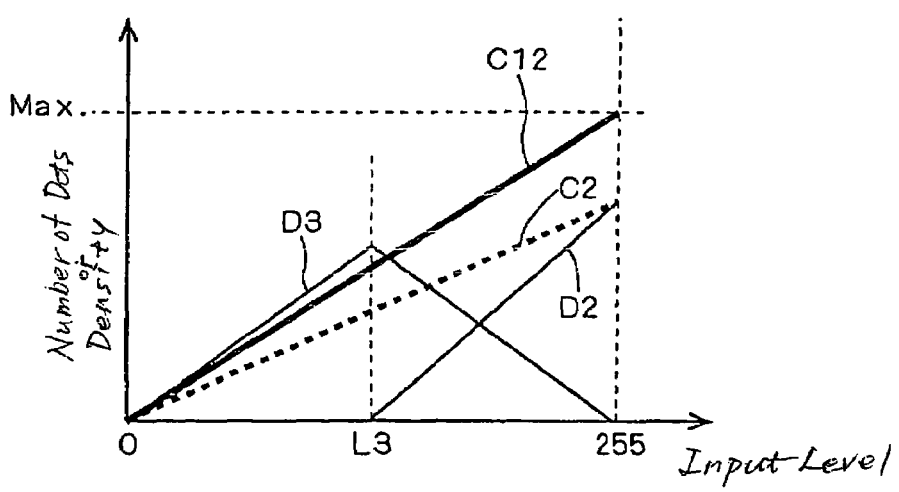
FIG. 8 illustrates the screen processing for small-sized characters (Example. 2)

In FIG. 8, D2 represents the number of imprinted small dots in dark ink, D3 the number of imprinted small dots in pale ink, and C2, C12 the print density of screen processing for small-sized characters or normal-sized characters.

As shown in FIG. 6, small dots in pale ink are imprinted starting from "0" and increases until the input level is peaked at the level L3, then decreases from the level L3 to approximately "0" at the level "255". Small dots in dark ink are imprinted starting from the neighborhood of the level L3 and increases toward the level "255".

Figure 9:
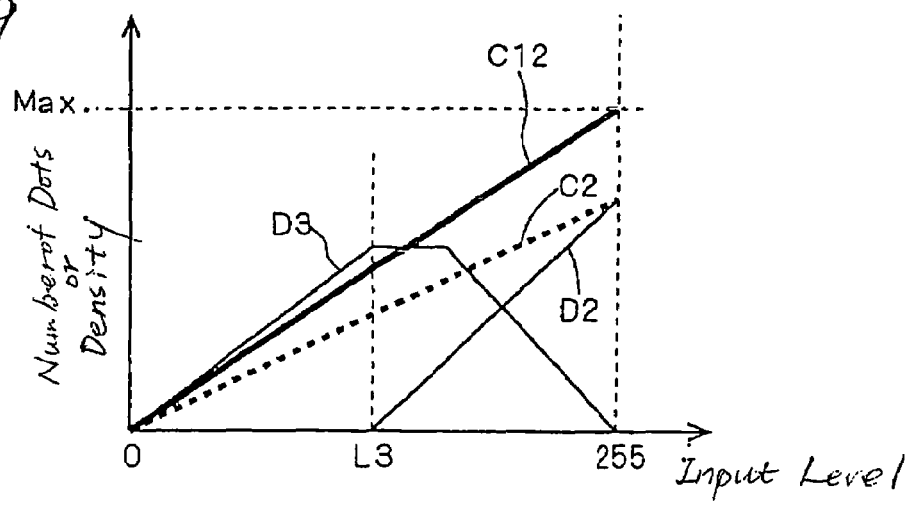
FIG. 9 illustrates the screen processing for small-sized characters (Example. 3)

In FIG. 9, control is made so that the number of imprinted small dots in pale ink D3 will be maintained at the peal value from the level L3 for a predetermined period. Except this, the control is the same as that in FIG. 8.

Figure 10:
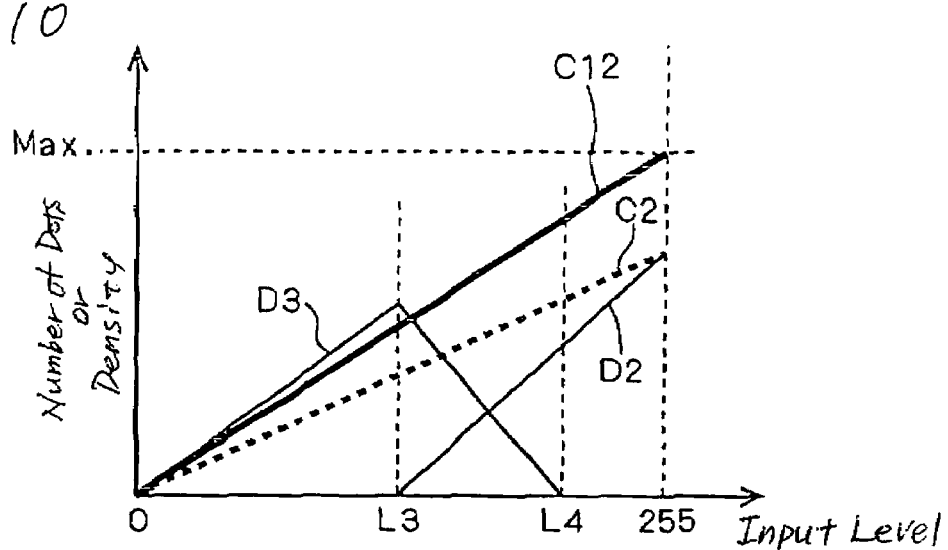
FIG. 10 illustrates the screen processing for small-sized characters (Example. 4)

In FIG. 10, control is made so that the number of imprinted small dots in pale ink D3 will decrease from the level L3 to approximately "0" at the level L4 (<"255"). Except this, the control is the same as that in FIG. 8.

Figure 11:
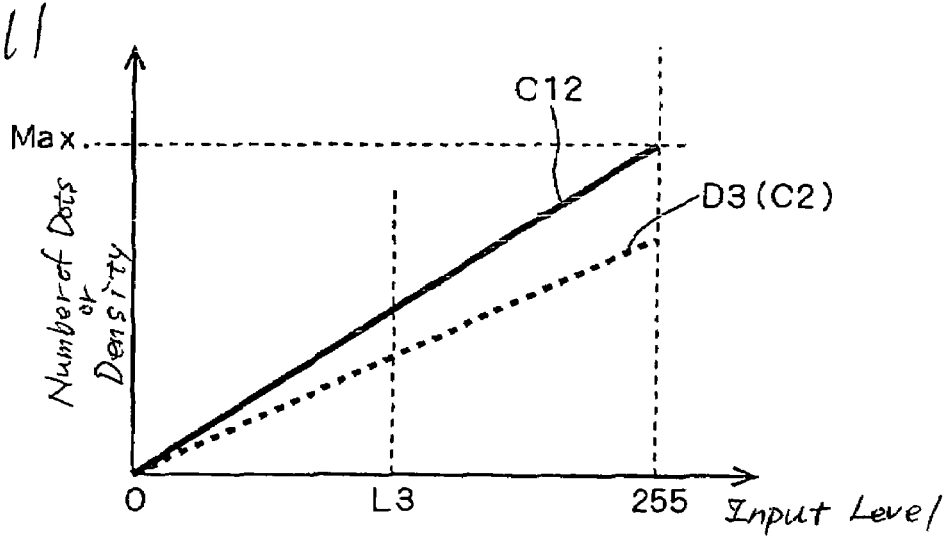
FIG. 11 illustrates the screen processing for small-sized characters (Example. 5)

In FIG. 11, only small dots in dark ink are used. Small dots in dark ink are imprinted starting from "0" and increases at a relatively mild inclination toward the input level "255".

In this way, by controlling the number of imprinted small dots in dark ink D2 and the number of imprinted small dots in pale ink D3 as density parameters (controlling only the number of imprinted small dots in dark ink D2 in the example of FIG. 11), the print density of a predetermined color C2 increases in proportion to the input level. Note that the print density C2 is shifted in the direction of a lower density compared with the print density C12.

The character densities C1 and C2 for small-sized characters are lower than the character densities C11 and C12 for normal-sized characters. For a small-sized character, its legibility requires sharpness rather than density of a character, so that the screen processing for small-sized characters which does not use large dots or medium dots can enhance the legibility of small-sized characters.

Characters of a normal or greater size undergo the same density setting as the prior art thus keeping the overall color (density) balance.

As mentioned above, it is possible to execute the dithering method or error diffusion method after the number of imprinted dots appropriate for the character density has been determined.

The screen processor 5 according to Embodiment 1 can perform screen processing on a per object basis. The screen processor 5 can thus perform batch screen processing for small-sized characters on the small-sized character drawing data in units of characters. As a result, it is possible to select between the screen processing for small-sized characters and the screen processing for normal-sized characters in a relatively easy fashion.

Embodiment 2

Processing by the Color Converter 4

Figure 12:
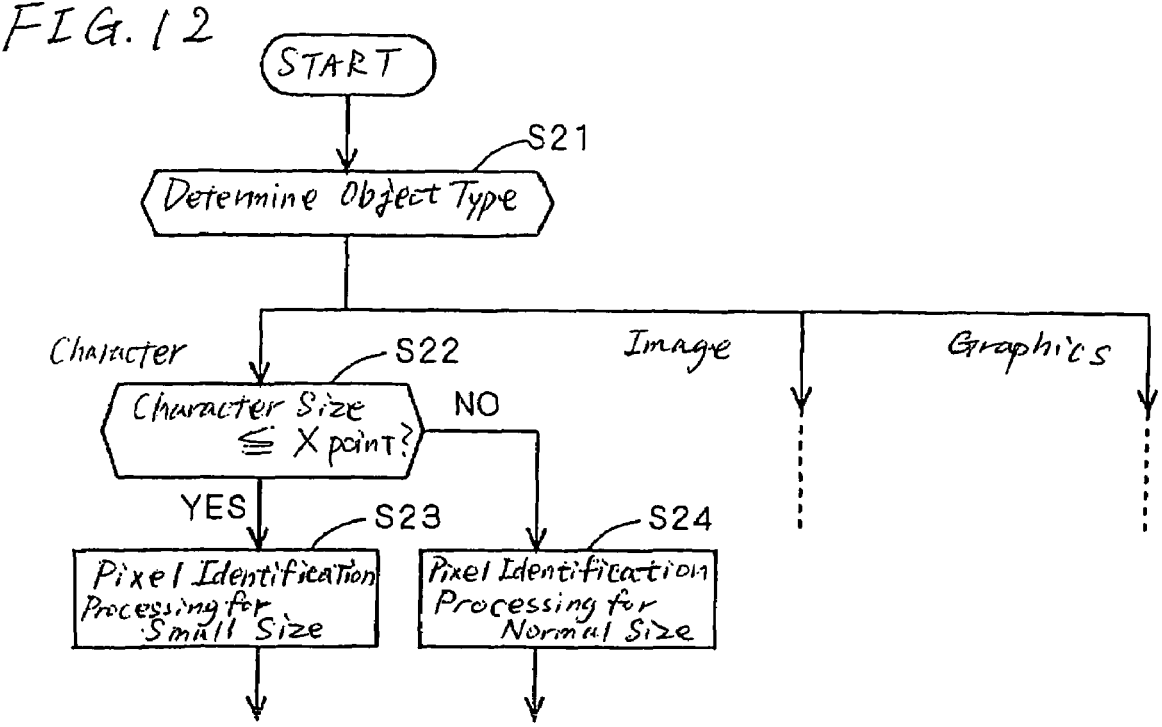
FIG. 12 is a flowchart showing part of the processing by the color converter in the print system according to Embodiment 2 of the invention.

FIG. 12 is a flowchart showing part of the processing by the color converter 4 in the print processing apparatus 10 according to Embodiment 2 of the invention. FIG. 12 shows the processing on the drawing data per object following drawing processing by the object drawing section 3.

Referring to FIG. 12, object type is determined in step S21. This processing classifies objects into a character, an image and graphics. Processing on images or graphics has little relationship with the characteristics of this embodiment so that the processing is not shown or described.

In step S22 executed in case it is determined that the object type is a character in step S21, it is determined whether the character size is equal to or smaller than X point. In case the character size is equal to or smaller than X point, execution assumes specific data of a small character size and proceeds to pixel identification processing for small-sized characters in step S23. In case the character size exceeds X point, execution determines that the character size is a normal size or greater and proceeds to pixel identification processing for normal-sized characters in step S24. Determination on the presence/absence of small-sized characters equal to equal to or smaller than X point is the same as that in Embodiment 1 (step S12 in FIG. 1), so that the corresponding description is omitted.

In step S24, pixel identification processing for normal-sized characters is performed. In case the color converter 4 is can perform color conversion on a per pixel basis (setting of gradient), some of the input levels indicating the gradient is made available as small-sized character identification information. That is, gradient adjustment processing is performed to avoid setting of a specific gradient working as small-sized character identification information.

For example, in case input levels are "0" to "255", the values from "253" to "255" are treated as "255" in order to avoid setting of the values at the input levels "253" and "254" thus making available these input levels as small-sized character identification information.

In case the color converter 4 can recognize character area information and cannot perform color conversion on a per pixel basis, pixel identification processing for normal-sized characters is skipped.

In step S23, pixel identification processing for small-sized characters is performed. In case the color converter 4 is can perform color conversion on a per pixel basis, forcible gradient setting is performed to convert an input level equal to or greater than a predetermined level indicating a high density to small-sized character identification information rather than using the original input level.

For example, in case input levels are "0" to "255", "250" is specified as the predetermined level and an input level equal to or greater than "250" is forcibly converted to "253" or "254". The levels "253" and "254" are made available in the above step S24 so that they can be used as small-sized character identification information. In case the input level is equal to or smaller than "249", conversion is skipped.

According to the aforementioned processing, a pixel of a small-sized character whose input level is equal to or smaller than "249" indicating a low density is not converted to small-sized character identification information. An advantage of this method is that it can be implemented, in a relatively easy fashion, into a printer system including a screen processor 5 which cannot perform screen processing on a per object basis.

In case the color converter 4 can recognize only the character area information and cannot perform color conversion on a per pixel basis, the following processing is performed as pixel identification processing for small-sized characters.

The address of a pixel corresponding to a small-sized character is recorded into a separate memory area on the pixel storage memory as a small-size character pixel storage table (pixel identification table). This method allows identification of small-sized characters at all input levels including low-density input levels equal to or smaller than "249". A disadvantage of this method is that is that a relatively heavy load is applied when the method is implemented into a printer system including a screen processor 5 which cannot perform screen processing on a per object basis.

Processing by the Screen Processor 5

Figure 13:
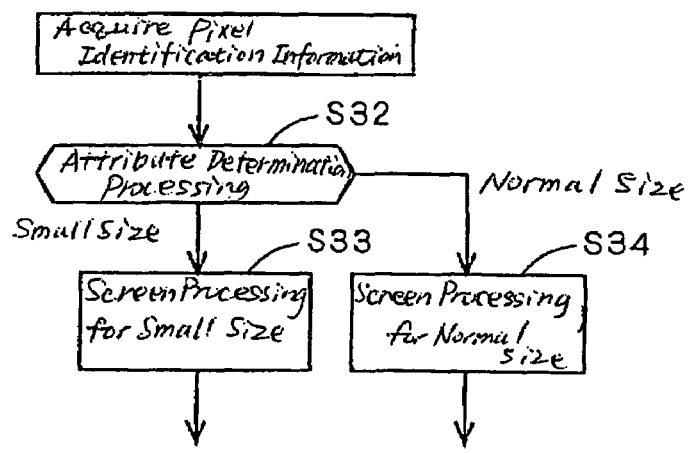
FIG. 13 is a flowchart showing the screen processing by the screen processor according to Embodiment 2.

FIG. 13 is a flowchart showing the screen processing by the screen processor 5 according to Embodiment 2.

Referring to FIG. 13, pixel identification information is acquired in step S31. In case small-sized character identification information is inserted as pixel identification information into some of the pixel input levels, the input level of a pixel is acquired. In case the small-sized character pixel storage table as pixel identification information is present, the address corresponding to the pixel is acquired.

Next, attribute determination processing is performed in step S32. In case small-sized character identification information is inserted as pixel identification information into some of the pixel input levels, it is determined whether to perform screen processing for small-sized characters or screen processing for normal-sized characters depending on whether the input level of each pixel is small-sized character identification information.

In case the small-sized character pixel storage table is present, it is determined whether to perform screen processing for small-sized characters or screen processing for normal-sized characters depending on whether the address corresponding to the pixel is found in the small-sized character pixel storage table.

In step S33 executed when screen processing for small-sized characters is determined in step S32, screen processing for small-sized characters same as that in Embodiment 1 (step S13 in FIG. 2) is performed on a per pixel basis. In case small-sized character identification information is inserted into some of the pixel input levels, the input level is treated as "253" or "254" being small-sized character identification information without exception.

In step S34 executed when screen processing for normal-sized characters is determined in step S32, screen processing for small-sized characters same as that in Embodiment 1 (step S13 in FIG. 2) is performed on a per pixel basis. In case small-sized character identification information is inserted into some of the pixel input levels, the input levels "253" to "255" are treated as the input level "255" without exception.

In this way, according to Embodiment 2, it is possible to enhance the legibility of small-sized characters without losing the color balance of the overall printed document even in case the screen processor 5 cannot perform screen processing on a per object basis.

Embodiment 3

Figure 14:
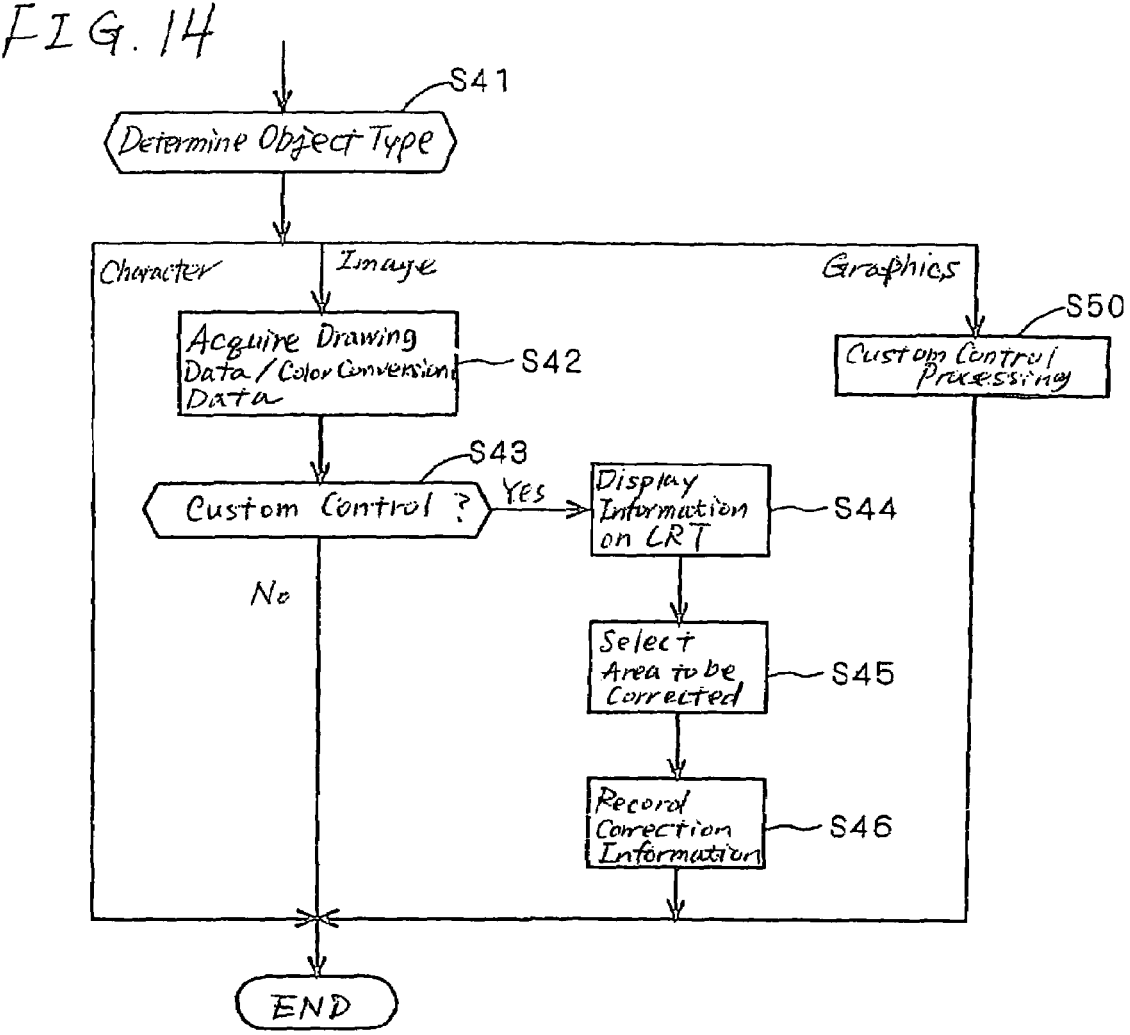
FIG. 14 is a flowchart showing part of the processing by the custom information controller in the print system according to Embodiment 3 of the invention.

FIG. 14 is a flowchart showing part of the processing by the custom information controller 11 in the print system according to Embodiment 3 of the invention. FIG. 14 shows the processing which takes place after the drawing data to specify each object as classified by the language analyzer 23 is supplied from the color converter 4.

Referring to FIG. 14, object type is determined in step S41. This processing classifies objects into a character, an image and graphics. Processing on characters does not undergo custom control so that the processing by the custom information controller 11 is skipped in case the object type is determined as a character.

In step S42 executed in case it is determined that the object type is graphics in step S41, drawing data which has undergone processing by the object drawing section 3 and the color converter 4 is acquired from the color converter 4.

In step S43, the user is prompted to select whether to perform custom control from the input section 13. In case the user does not wish to perform custom control (No), execution is terminated. In case user wishes to perform custom control (Yes), execution proceeds to step S44.

In step S44, the custom information controller 11 displays graphics on the CRT 12 based on the drawing data. The custom information controller 11 highlights the graphics area whose primary color density before color conversion is close to 100% as candidate for correction.

In step S45, the user is prompted to select an area to be corrected. The user operates the input section 13 to select an area in the graphics displayed on the CRT 12.

In step S46, correction information recording processing is performed to the effect that the pixels corresponding to the selected area are selected non-character data (specific data). Correction information recording processing may be processing similar to insertion of small-sized character identification information or use of the small-sized character pixel storage table mentioned in Embodiment 2.

The former processing is insertion of selected area identification information as an input level of a pixel in the selected area similar to insertion of small-sized character identification information. The latter processing is storage of the address of a pixel in the selected area into a selected area pixel storage table which separately provides the addresses of pixels in the selected area, similar to the small-sized character pixel storage table. When the processing in S46 is complete, custom control processing by the custom information controller 11 is complete.

In step S50 executed in case it is determined that the object type is an image in step S41, same custom control processing as that for graphics performed in steps S42 through S46 is executed then execution is terminated.

In case the object types determined are a character and non-character in step S41, the above custom control processing is performed as a single unit in case the object type is non-character (graphics or an image).

Processing by the Screen Processor 5

Processing by the screen processor 5 is performed, same as the processing shown in FIG. 13 of Embodiment 2. Difference from Embodiment 2 will be described referring to FIG. 13.

In step S32, in case selected area identification information is inserted as a pixel input level of a selected area, it is determined whether to perform screen processing for small-sized characters (selected area) or screen processing for normal-sized characters depending on whether the input level of each pixel is selected area identification information. In case the selected area pixel storage table is present, it is determined whether to perform screen processing for small-sized characters (selected area) or screen processing for normal-sized characters depending on whether the address corresponding to the pixel is found in the selected area pixel storage table.

In step S33, screen processing for small-sized characters same as that in Embodiment 1 (step S13 in FIG. 2) is performed. In case selected area identification information is inserted into some of the pixel input levels, the input level is treated as "253" or "254" being selected area identification information without exception.

In step S34, screen processing for small-sized characters same as that in Embodiment 1 (step S13 in FIG. 2) is performed on a per pixel basis. In case selected area identification information is inserted into some of the pixel input levels, the input levels "253" to "255" are treated as the input level "255" without exception.

In this way, according to Embodiment 3, it is possible to apply screen processing for small-sized characters on the user-selected area for graphics and an image as well. This allows setting of a print density required by the user.

What is claimed is:

1. A print processing apparatus comprising:
an object information identification section for receiving drawing data including a specific object and identifying said specific object as data for drawing a specific object from the drawing data;
a gradient adding section for adding a gradient to said drawing data on a per pixel basis; and
a screen processor for performing screen processing including setting of density to which a density parameter is applied based on said gradient;
wherein said screen processor performs specific screen processing for setting density to specific data out of said data for drawing a specific object by applying, as a density setting parameter, a parameter shifted to a lower density than said drawing data except said specific data.

2. The print processing apparatus according to claim 1, wherein said setting of density includes setting of density using at least one of a plurality of dot types whose print volumes per dot differ from each other,
wherein said specific screen processing includes said setting of density using only a dot type whose print volume is the smallest out of said plurality of dot types, and
wherein the processing except said specific screen processing includes said setting of density using at least two types of dots out of said plurality of dot types.

3. The print processing apparatus according to claim 1, wherein said gradient adding section further adds pixel identification information identified on a per pixel basis to said specific data, and
wherein said screen processor recognizes whether the data for drawing a specific object is said specific data based on said pixel identification information and performs said specific screen processing on a per pixel basis.

4. The print processing apparatus according to claim 3, wherein said gradient adding section performs forcible gradient setting processing which sets a specific gradient to said specific data on a per pixel basis and gradient adjustment processing which avoids setting of said specific gradient to said drawing data except said specific data, and
wherein said pixel identification information includes a value indicating a specific gradient in said drawing data.

5. The print processing apparatus according to claim 3, wherein said pixel identification information can identify a pixel corresponding to said specific data and includes a pixel identification table stored in a predetermined storage section.

6. The print processing apparatus according to claim 1, wherein said specific object includes a character, and
wherein said specific data includes data for drawing small-sized characters as said data for drawing specific object specifying a character equal to or smaller than a predetermined size.

7. The print processing apparatus according to claim 6, wherein said screen processor performs said specific screen processing on said data for drawing small-sized characters on a per character basis.

8. The print processing apparatus according to claim 1, wherein said specific object includes an object other than a character, and
wherein said specific data includes non-character data selected out of said data for drawing a specific object in accordance with a predetermined selection method.

9. The print processing apparatus according to claims 8, further comprising:
an area selection section for receiving said drawing data, displaying an image which is based on said drawing data on predetermined display means, and allowing an area in the image which is based on said drawing data to be selected as a selected area by way of operation from a predetermined input section,
wherein said predetermined selection method includes a method for selecting said drawing data corresponding to said selected area as said selected non-character data.

10. A print processing apparatus comprising:
a gradient adding section for adding a gradient to drawing data on a per pixel basis; and
a screen processor for performing screen processing including setting of density to which a density parameter is applied based on said gradient,
wherein said gradient adding section performs forcible gradient setting processing which sets a specific gradient to said specific data on a per pixel basis and gradient adjustment processing which avoids setting of said specific gradient to said drawing data except said specific data, and
wherein said screen processor recognizes whether the data for drawing a specific object is said specific data on a per pixel basis based on the gradient of said drawing data and performs specific screen processing on the specific data on a per pixel basis.

11. A print processing method comprising:
(a) step of identifying a specific object as data for drawing a specific object from drawing data including the specific object;
(b) a step of adding a gradient to said drawing data on a per pixel basis; and
(c) a step of performing screen processing including setting of density to which a density parameter is applied based on said gradient,
wherein said method performs specific screen processing which performs density setting by applying, as a density setting parameter, a parameter shifted to a lower density than said drawing data except said specific data, to specific data out of said data for drawing a specific object.

12. The print processing method according to claim 11, wherein said setting of density in said step (c) includes setting of density using at least one of a plurality of dot types whose print volumes per dot differ from each other,
wherein said specific screen processing includes said setting of density using only a dot type whose print volume is the smallest out of said plurality of dot types, and
wherein the processing except said specific screen processing includes said setting of density using at least two types of dots out of said plurality of dot types.

13. The print processing method according to claim 11, wherein said step (b) further adds pixel identification information identified on a per pixel basis to said specific data, and
wherein said step (c) recognizes whether the data for drawing a specific object is said specific data based on said pixel identification information and performs said specific screen processing on a per pixel basis.

14. The print processing method according to claim 13, wherein said step (b) includes:
(b-1) a step of setting a specific gradient to said specific data on a per pixel basis; and (b-2) a step of avoiding setting of said specific gradient to said drawing data except said specific data, wherein said pixel identification information includes a value indicating a specific gradient in said drawing data.

15. The print processing method according to claim 13, wherein said pixel identification information can identify a pixel corresponding to said specific data and includes a pixel identification table stored in a predetermined storage section.

16. The print processing method according to claim 11, wherein said specific object includes a character, and wherein said specific data includes data for drawing small-sized characters as said data for drawing specific object specifying a character equal to or smaller than a predetermined size.

17. The print processing method according to claim 16, wherein said step (c) performs said specific screen processing on said data for drawing small-sized characters on a per character basis.

18. The print processing method according to claim 11, wherein said specific object includes an object other than a character, and said method further includes:

(d) a step of receiving said drawing data, displaying an image which is based on said drawing data on predetermined display means, and prompting selection of an area in the image which is based on said drawing data as a selected area by way of operation from a predetermined input section; and (e) a step of selecting said drawing data corresponding to said selected area as said non-character data selected by way of operation from said predetermined input section during said step (d).

19. A print processing method comprising:

(a) a step of adding a gradient to drawing data on a per pixel basis; and (b) a step of performing screen processing including setting of density to which a density parameter is applied based on said gradient, wherein said step (a) includes:

(a-1) a step of setting a specific gradient to specific data out of said drawing data on a per pixel basis; and (a-2) a step of avoiding setting of said specific gradient to said drawing data except said specific data, and wherein said step (b) recognizes whether the data for drawing a specific object is said specific data on a per pixel basis based on the gradient of said drawing data and performs specific screen processing on the specific data on a per pixel basis.

* * * * *